um005926389A

United States Patent [19]
Trounson

[11] Patent Number: 5,926,389
[45] Date of Patent: Jul. 20, 1999

[54] COMPUTER CONTROL SYSTEM FOR GENERATING GEOMETRIC DESIGNS

[76] Inventor: James E. Trounson, 8302 Gentle Brook Ct., Laurel, Md. 20723

[21] Appl. No.: 08/193,634

[22] Filed: Feb. 8, 1994

Related U.S. Application Data

[63] Continuation of application No. 07/655,857, Feb. 15, 1991, abandoned.

[51] Int. Cl.⁶ .................................................. G06F 19/00
[52] U.S. Cl. .................................. 364/474.29; 364/474.3; 364/167.07
[58] Field of Search ......................... 364/474.28, 474.29, 364/474.3, 474.31, 167.02, 167.07, 167.09, 188, 130, 474.12; 318/599–603; 395/84

[56] References Cited

U.S. PATENT DOCUMENTS

| 4,639,653 | 1/1987 | Anderson et al. | 364/474.12 |
| 4,777,603 | 10/1988 | Woodman et al. | 364/130 |
| 4,786,847 | 11/1988 | Daggett et al. | 395/84 |
| 4,794,540 | 12/1988 | Gutman et al. | 364/474.29 |
| 4,829,419 | 5/1989 | Hyatt | 364/188 |
| 4,876,494 | 10/1989 | Daggett et al. | 395/84 |

*Primary Examiner*—William Grant
*Assistant Examiner*—Steven R. Garland
*Attorney, Agent, or Firm*—Burns, Doane, Swecker & Mathis, L.L.P.

[57] ABSTRACT

A servo control system for a machine tool or the like requires only a single computational resource, such as a microprocessor, to provide coordinated control along multiple axes. No active control mechanism is required for any axis outside of the single resource. A real time multitasking approach enables the single resource to control multiple axes of motion, with the control of each individual axis being carried out by means of simple, yet effective, routines that conserve computing power. The routines also facilitate the generation of geometric designs in other media, such as the display of such shapes on a video screen or via a printer.

10 Claims, 6 Drawing Sheets

FIG. 5

PATH TABLE 1

| AXIS | POSITION 34 | VELOCITY 36 | ACCCELERATION 38 | JERK 40 |
|---|---|---|---|---|
| 1 | W . F | W . F | W . F | W . F |
| 2 | W . F | W . F | W . F | W . F |
| 3 | W . F | W . F | W . F | W . F |
| 4 | W . F | W . F | W . F | W . F |
| 5 | W . F | W . F | W . F | W . F |
| 6 | W . F | W . F | W . F | W . F |

PATH TABLE 2

| | | | | |
|---|---|---|---|---|
| 1 | W . F | W . F | W . F | W . F |
| 2 | W . F | W . F | W . F | W . F |
| 3 | W . F | W . F | W . F | W . F |
| 4 | W . F | W . F | W . F | W . F |
| 5 | W . F | W . F | W . F | W . F |
| 6 | W . F | W . F | W . F | W . F |

COMPUTER CONTROL SYSTEM FOR GENERATING GEOMETRIC DESIGNS

This application is a continuation of application Ser. No. 07/655,857, filed Feb. 15, 1991, now abandoned.

BACKGROUND OF THE INVENTION

The present invention is directed to a computer control system for generating geometric designs in a tangible form. In one preferred embodiment, the invention is directed to a servo control system for machine tools which cut or form pieces of material, such as metal or wood, into desired geometric shapes.

Since the 1950's, servo control systems have been used for the control of machine tools, to automate repetitive machine operations. At first, these systems were large, complex, inflexible and expensive; operating in many ways like a player piano, with programs stored on paper tape. Over the years, these systems have evolved into powerful, reliable and reasonably priced fixtures of industry. Servo controls now integrated with computer technology are referred to as CNC or DNC systems (Computer Numerical Control or Direct Numerical Control). Along with production lines and the concept of interchangeable parts, machine tools equipped with CNC systems have become an integral part of modern mass production technology.

Even though CNC systems are highly economical for mass production of machined components, the vast majority of machine tools worldwide are still operated by hand. The reason for this apparent contradiction is that most machine tools are not used for mass production. Rather, they are used for prototyping, repair, or small quantity production.

If a machine is used to make large quantities of a single component, the time spent writing a CNC program and setting up the machine is quickly recovered during actual production. If the user is only interested in one sample of a part, however, he can typically make that one sample faster with manual control than he can program the CNC.

The obstacles to using prior CNC systems for small quantity production are the rigid demarcations between the stages leading to actual production on CNC machine tool systems. The desired part must first be designed, this design must then be translated into a "tool path" which will cut the part, and finally this tool path must be translated into codes (sometimes known as G-codes) for use by the CNC system. This three-step process is typically carried out by different people using different equipment in each step.

It is one objective of the present invention to provide automation techniques which allow small quantity production on machine tools and other equipment to be substantially improved, compared to either traditional manual or traditional CNC approaches. At present, about 95% of all machine tools are manual, so that more than 95% of machine operators are using manual machines (since one operator can sometimes service more than one CNC machine). A main objective of the present invention is to substantially improve the productivity of this large majority of operators. The direct value of such improved productivity will be very large and its "economic ripple effect" could be even larger.

There are several million manual machine tools in place worldwide. The techniques disclosed herein are applicable to the majority of these machines by means of adding or "retrofitting" computer control systems, which embody the principles of the present invention, to these machines. Although the present invention is directed primarily toward automation of existing and/or new manual equipment, the techniques disclosed herein will also benefit CNC machine tools used for mass production.

Part of the resistance to using CNC machines in the past for small quantity production is due to the large amount of processing power that is required. In conventional machine control environments, a large amount of processing power is required, and different parts of the manufacturing process are frequently carried out in different locations. Due to the distributed nature of tasks, computer aided drawing (CAD) or CAD/CAM (computer assisted manufacturing) operations are carried out on one processor and CNC operations are carried out with the use of several other processors. Typically, CNC systems have allocated one processor per motor being controlled, with each motor providing the driving force along one axis of machine operation. In addition, conventional CNC systems require another processor to coordinate the activities of these motor controllers, plus a processor to handle the user interface. No known multi-axis CNC system operates with a single central computational resource and without individual active axis controllers, which may be active analog feedback loops or digital feedback loops.

To enable manual machine tools to be automated in a manner which adapts them to be reliably and economically used for small quantity part production, two objectives are desireable. First, all of the tasks which were heretofore carried out in a distributed manner should be integrated into a single system that is controlled by one user through a consistent interface. Secondly, a control system should be available that provides coordinated control of movement along multiple axes in an economical manner with small processing power requirements.

The present invention is particularly directed to the latter of these two main objectives.

SUMMARY OF THE INVENTION

In achieving the desired objective of an economical control system with low processing power requirements, the present invention provides a combination of electronic hardware, a microprocessor (preferably embodied in a conventional personal computer), and control software blended together with unique systems integration techniques. When attached to a machine tool, the result is an integrated, interactive and intuitive system; capable of component design (CAD), tool path generation (CAM), and direct machine tool control (DNC) by one person at one work station with a consistent user interface.

All active components and functions are contained within a central computational resource which is shared among all motors in the system. At the heart of this invention is the concept of using one microprocessor for all system functions. In other words, no active components are dedicated specifically to only one motor. Rather, the motors are all controlled, in a coordinated and integrated fashion, by a central computational resource.

A good example of a central computational resource is a personal computer (PC). A modern personal computer might consist of an 80386 central processing unit (CPU) with or without an 80387 numeric coprocessor, both available from Intel Corporation. The personal computer also typically includes a keyboard subsystem, a disk controller subsystem, and a screen display subsystem (all subsystems could incorporate a microprocessor dedicated to those functions). Although the PC may contain several microprocessors, it is programed as and functions as a single computational resource.

Modern PC's contain "expansion slots" which are used to add functionality to the PC. There are in fact many examples of commercially available motor control systems which plug into a PC's expansion slot and which contain active components dedicated to controlling one motor each. The applicability of these systems is limited, however due to high cost, difficulty of programming, and great difficulty in achieving the required variety of tightly coordinated motion required of precision machine tool controllers.

In the present invention, the control processor is shared among the many different tasks required of the system by a technique of real time multitasking. By performing all system functions on one computer with one central computational resource, the barriers between the above described stages of component production are more easily and effectively broken down. By using one CPU, one memory space, one display screen, one user input device, and one disk drive system, data from any of the different stages of operation is directly accessible to any other part of the system, and coordinated movement along each of multiple axes of motion is produced.

BRIEF DESCRIPTION OF THE DRAWINGS

FIG. 5 is an example of the Path Tables stored in the memory of the computer;

DESCRIPTION OF THE ILLUSTRATED EMBODIMENT

The following is a description of one embodiment of the system concept behind the present invention. In this embodiment, the central computational resource comprises a microprocessor which forms part of a personal computer (PC), and is used to control motion along six independent axes. These axes could be the respective axes of relative movement between a cutting tool and a workpiece in a CNC machine tool, for example. Many other similar and useful embodiments, such as robotics or dedicated automation equipment, should become apparent to those skilled in the art.

Figure 1:
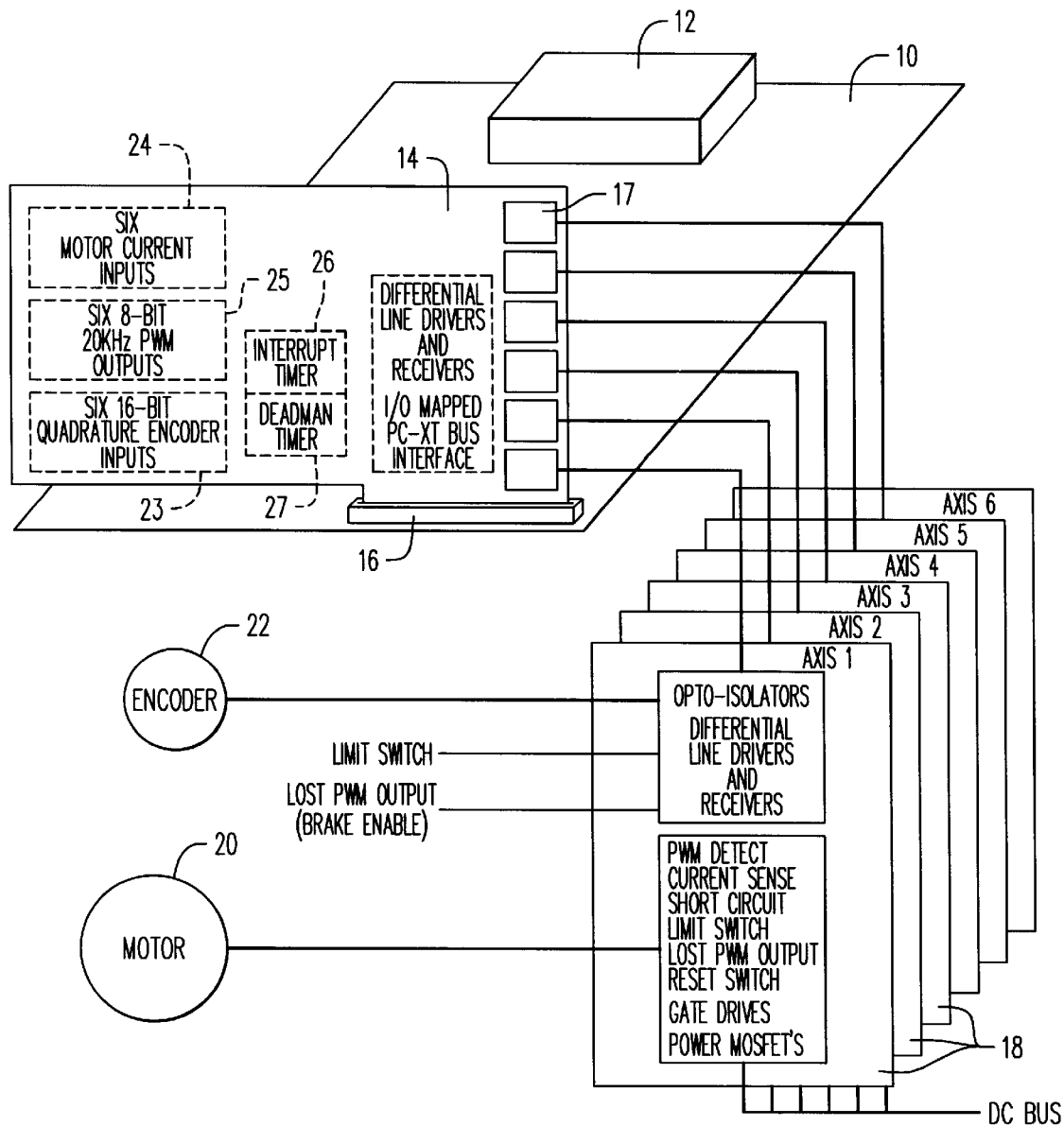
FIG. 1 is a block diagram of the hardware configuration for a multiple-axis servo control system.

Referring to the block diagram of FIG. 1, the basic system configuration of the machine tool controller comprises a personal computer having a motherboard 10 which houses a CPU 12. An interface card 14 is plugged into one of the expansion slots 16 on the motherboard, for communication with the CPU. The interface card 14 has I/O ports 17 which enable it to communicate with external power boards 18. One power board is associated with each axis under the control of the servo system. Connected to each power board is a motor 20 which provides the driving force for the axis, and an encoder 22 which provides motor position and/or velocity feedback information.

The CPU 12 of the personal computer, such as an 80386-based personal computer, is the only "active component" in the system. In the context of the present invention, the term "active" denotes a component or circuit which receives feedback information, processes it and carries out the operations necessary to complete a feedback loop. Thus, in the present invention the processor 12 does everything from closing all low level servo control loops to the highest level user interface functions. The user interface is a form of active feedback loop in which the computer enables the user to go from where he is to where he wants to be. Since the processor handles all active functions, there are no master/slave processors, no analog servo loops, no interprocessor communications, and no data format translations that are used or required.

Many of the specific values given in the following example are for the sake of clarity and to facilitate an understanding of the invention. The system in many cases could be operated successfully over a range of such values. The system could also operate successfully with 80286 or 80486 microprocessors which are generally software compatible with the 80386 microprocessor. The system could also be converted to work with 68000, 68020, 68030, and 68040 series microprocessors (manufactured by Motorola), other personal computers, or custom designed systems based on an architecture similar to modern personal computers.

Apart from the CPU 12, the major elements of the servo system are the hardware which provides communication between the CPU and the motor, and the software for controlling the CPU. These latter two elements are described in greater detail hereinafter.

Hardware

The electronic hardware implements several input and output functions, in addition to controlling power to the motors, but performs no active functions in the sense of closing servo loops. The following describes the function of the circuits on the interface card 14 and the power boards 18, which constitute the hardware component.

The interface card 14 includes up/down counters 23 which accumulate pulses from the optical encoders 22 attached to the motors, to allow the micro-processor 12 to read the position of the motors 20. The interface hardware also includes counters 24 which accumulate pulses, the frequency of which are proportional to current in the motors. In addition, the interface hardware includes counters 25 which are loaded by the CPU to send a fixed PWM (pulse width modulated) signal to the power boards. Another counter 26 within the interface card circuitry is loaded with a value which thereafter causes the card to produce a fixed frequency pulse that is used to signal interrupts to the computer, for requesting servo control updates. A deadman timer 27 on the interface card is periodically loaded by the CPU. If it is not reloaded periodically, PWM signals and control interrupts are automatically shut off as a safety feature.

To sequentially access each axis, a pointer latch (not shown) on the interface card is rippled each time a PWM count is loaded into one of the counters 25. The output from this pointer latch indicates which one of the six axes is to receive the PWM signal. The amount of I/O space that is required is thereby reduced because all sets of I/O ports are at the same physical address for the CPU, but are individually selected via the pointer latch.

The electronic hardware on the power boards 18 converts the logic level PWM signal to a high voltage PWM signal at current levels necessary to run DC motors, for example, by means of power transistors in an "H" bridge configuration, or a three-phase bridge for operating a brushless motor. The power electronic circuit on each power board performs a "break before make" function on the power bridge, does a current-to-frequency conversion, and verifies that the PWM signal frequency is within an acceptable range. Circuitry for carrying out these operations is conventional, and is therefore not described in further detail herein.

Software

Figure 2:
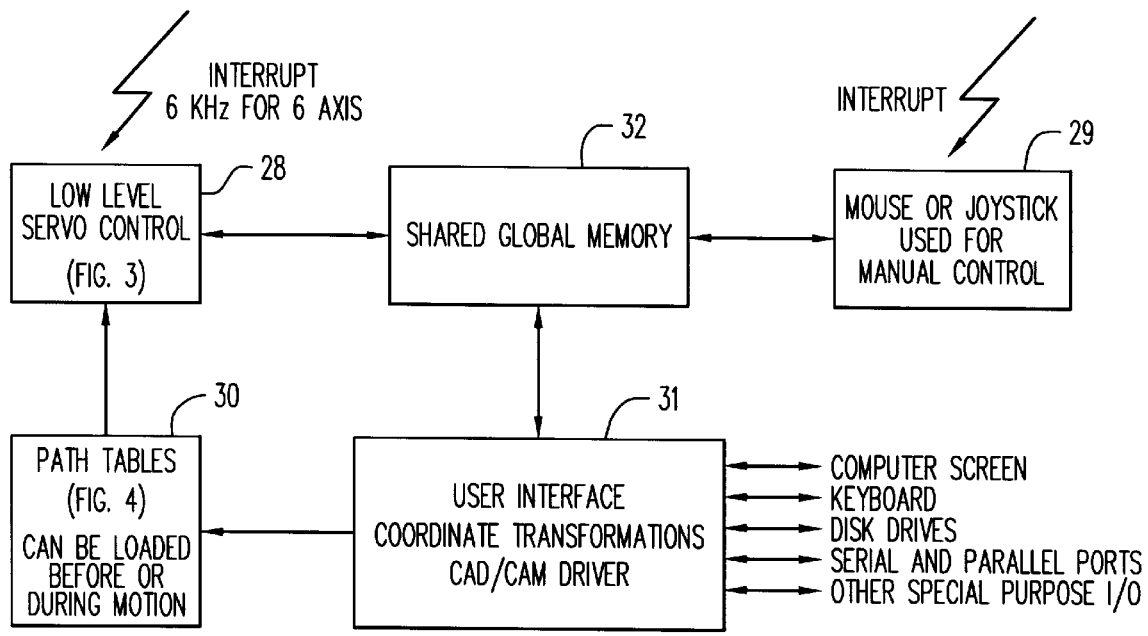
FIG. 2 is a block diagram of the system software architecture.

The system software operates under an operating system appropriate to the personal computer in which it is installed, such as MS DOS (Microsoft Disk operating System) for example. With reference to the software system architecture diagram of FIG. 2, the software is divided into four distinct tasks. These tasks are:

| Name | Priority | Rate |
|---|---|---|
| Low level servo loop 28 | highest | 6000 Hz |
| Mouse monitoring 29 | 2nd | 60 Hz |
| Path construction 30 | 3rd | 10 Hz |
| User interface 31 | lowest | foreground |

Three of these tasks (28, 29 and 30) are invoked periodically through hardware generated interrupt requests, which occur at the rates shown in the "Rate" column in the above table for the example described herein. The fourth task 31 is the foreground task which operates whenever no hardware interrupts are pending or active. All of the tasks have access to a common shared memory 32. The net result is a smoothly operating system over which the operator has immediate control and seldom waits for the system to process data. Even while extended cutting operations are being carried out by a machine tool under control of the system, other parts can be concurrently designed or other operations on the part being cut can be concurrently programmed, for example. If any one task required too much computing power, the system would not work as a whole.

Servo Loop Control

The highest priority task in the system is the low level servo control loop. A computationally efficient and dynamically stable algorithm at this level, to control the motors, is a prerequisite to a low-cost and workable CNC system. A preferred algorithm is depicted in the flow chart of FIG. 3. A particular advantage of this algorithm is that, when written in assembly language, it requires only a small fraction of the system computing resources. Running on a 25 MHz 386 PC, for example, one cycle of the servo algorithm executes in 40 to 50 microseconds. When controlling 6 axes at a rate of 1000 times per second, this requires only 240 to 300 microseconds out of every 1000 micro seconds (1/1000 second) or 25 to 30% of the microprocessor's computing power.

Since all of the servo loops are serviced sequentially by one processor, they are all inherently synchronized to each other. This is particularly significant since the primary objective of any CNC system is to produce coordinated motion among all of the axes.

Figure 3:
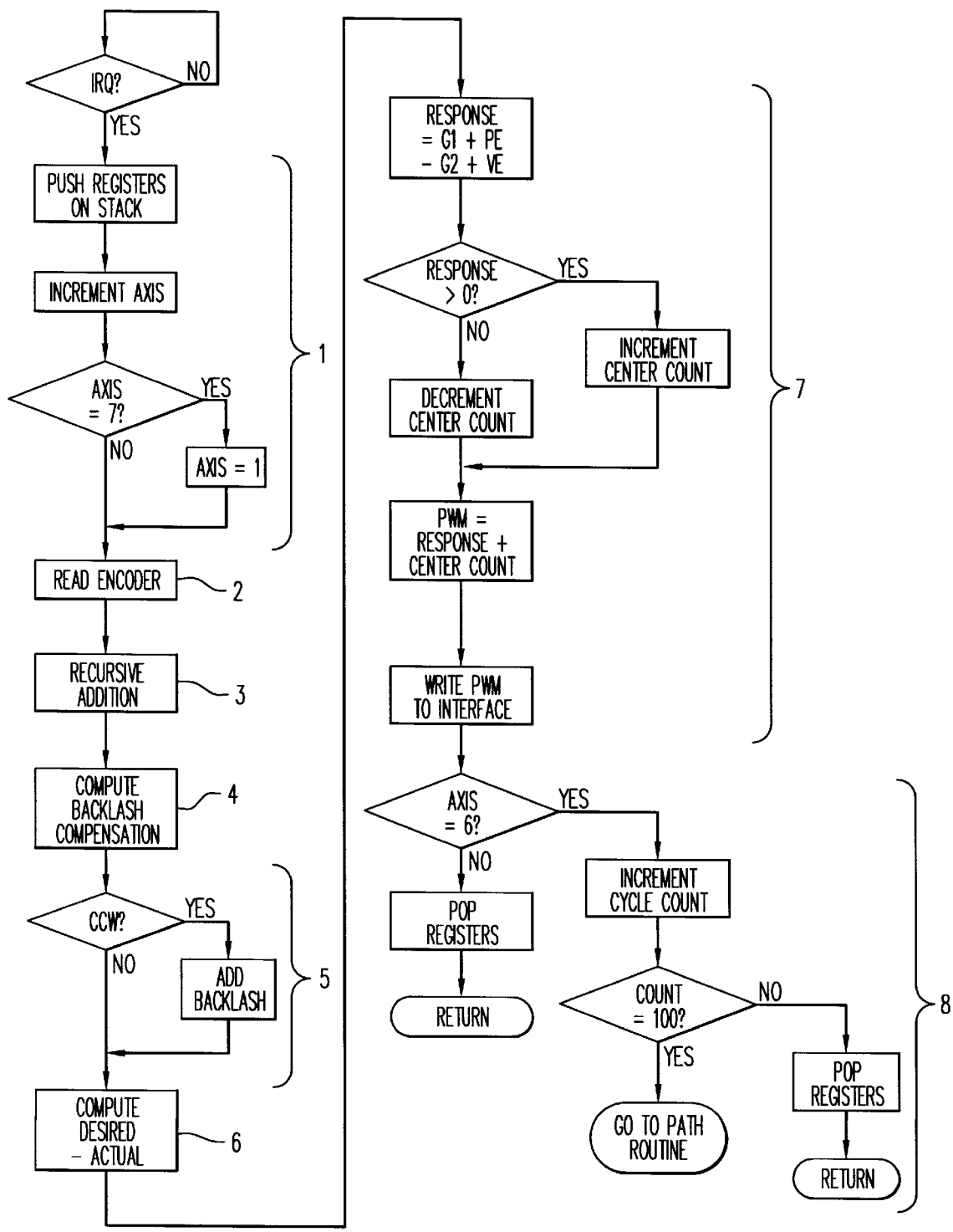
FIG. 3 is a flow chart of the Low Level Servo Loop algorithm.

In the example presented herein, the control of each axis is updated 1000 times per second. Thus, when controlling six axes, the Servo Control Loop shown in FIG. 3 is accessed 6000 times per second. The accessing of this control loop is carried out in response to an interrupt request (IRQ), which is generated by the counter 26 in the interface card 14 at a rate of 6 KHz. Once an interrupt occurs, the operation of the Servo Control Loop is carried out as follows:

Step 1—Push Registers and Increment . . . The state of the processor is saved so it knows where and how to return after the interrupt routine has been serviced. In addition, the next axis in sequence is selected for control.

Step 2—Read Encoder . . . A 32-bit count which represents actual motor armature position, in units of "encoder counts", is read from the counter 23 on the interface card 14. Typically the encoder might produce 2000 pulses per revolution. When geared to a 5 thread per inch (2 threads/cm) ball screw with a 2.5:1 ratio, each pulse represents 0.000040 inch ($1.6 \times 10^{-5}$ cm) of travel of the machine tool along the associated axis.

Step 3—Perform Recursive Addition . . . During each control cycle the processor must determine a desired motor position in units of encoder counts (position count). If one axis were to require constant velocity, this is achieved by adding a constant number of encoder counts (velocity count) to the desired encoder position count each control cycle. If the motor is required to remain stationary, then the velocity count is zero. By extension this concept can be extended to higher order terms. If constant acceleration is required, during each control cycle an acceleration count is added to the velocity count which is in turn added to the position count. This technique can be extended to jerk (rate of change of acceleration) and beyond. This approach allows a continuous polynomial function to be exactly reconstructed in a piecewise fashion using only addition instructions. By contrast, if polynomials had to be solved every control cycle using floating point multiplication, not enough computing power would remain from a 386-based PC to run the rest of the system.

The particular values for position, velocity, acceleration and jerk, which are to be recursively added, are stored in Path Tables A in the memory of the microprocessor. The manner in which these values are derived is explained in greater detail hereinafter with reference to FIGS. 4 and 5.

Step 4—Compute backlash compensation.

Step 5—Compute actual motor velocity . . . If the motor is turning clockwise, backlash compensation encoder counts are added to the desired position count. Otherwise, nothing is added.

Step 6—Subtract actual from desired position counts and velocity counts . . . This provides position count error and velocity count error.

Step 7—Compute the servo feedback response . . . The PWM (pulse width modulated) count loaded into the counter 25 is an 8-bit count which can range from 0 to 255. 0 represents full power clockwise, 255 full power counterclockwise, and 128 is zero power. More particularly, the PWM signal is a binary "low/high" signal. When this signal is in one state, e.g. high, power flows in one direction to the motor. When the signal is in the other state, power flows to the motor in the opposite direction. The particular number that is stored in the counter 25 determines the ratio of these two levels to one another during a cycle of the signal. For example, a value of 0 indicates that the PWM signal remains in the low state to provide full power clockwise, 255 indicates that the signal remains in the high state to provide full power counterclockwise, and 128 indicates that the signal alternates between the two states evenly.

The PWM count value (motor power) is computed in the following manner:

control response=(G1*PE)−(G2*VE) PWM count=center count+control response where G1 and G2 are gain values, PE is position error, and VE is velocity error.

The center count value begins at 128 (zero power) and is adapted every control cycle in the following fashion:

if control response >0 then the center count is increased, for example by 1 if control response <0 then the center count is decreased.

The net result of this calculation is an adaptive response where the center count closely approximates the PWM count which would have provided the average power demanded by the motor over the previous several control cycles. This is a very simple but effective control algorithm which is almost unconditionally stable, rejects disturbances very robustly, and produces "zero following error".

Once the PWM count value is determined it is written to the PWM counter 25 on the interface board.

Step 8—End loop . . . If axes 1 through 5 have just been completed, then the registers are popped and the processor returns back to the operation it left to service the interrupt. If axis 6 has been completed then the control cycle count is incremented.

If the control cycle count is less than 100 then the registers are popped and the microprocessor returns to its previous task. If the control cycle count equals 100 then the Path Construction Task (FIG. 4), which is responsible for toggling path tables, computing new recursive coefficients, and loading them into tables, is called up. This task requires between 5 and 35 subsequent control cycle periods (5 to 35 ms out of 100 ms) to complete, depending on the nature of the path being followed. This one interrupt does not return for several milliseconds, but interrupts are enabled and subsequent control cycle interrupts do interrupt this routine before it returns.

Path Construction Task

Figure 4:
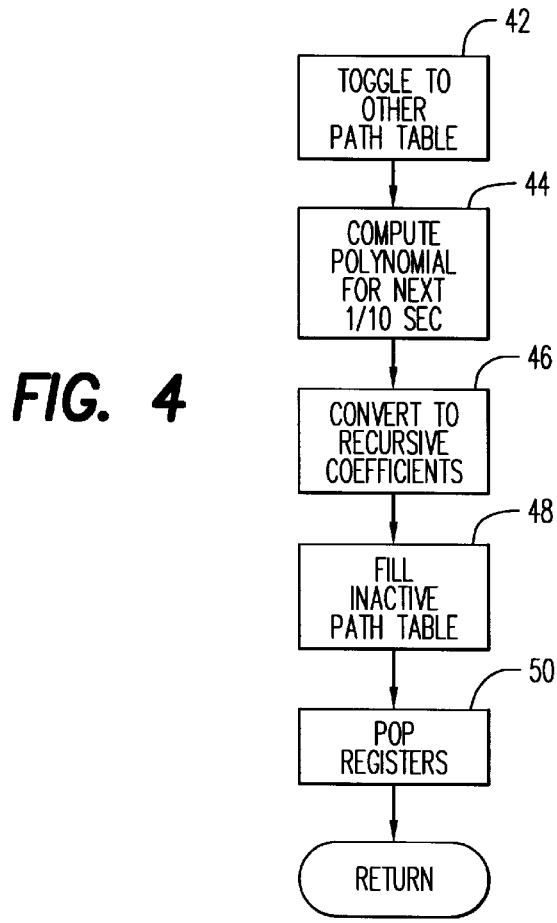
FIG. 4 is a flow chart illustrating the Path Construction Task.

The Path Construction Task is invoked as described in Step 8 above, and is illustrated in FIG. 4. This routine is technically invoked by the Low Level Servo Loop hardware interrupt once out of every 600 interrupts (10 times per second)t The purpose of this task is to read actions which have been stored in memory, convert these to detailed tool path descriptions, and to convert these tool path descriptions into path tables used by the low level servo loop in the recursive addition step. The exact tool path is determined by the sequence of the actions combined with the value of the variables which describe each action.

The end products of the Path Construction Task are Path Tables which contain values describing the tool path. These are the values which are used in Step 3 of the Low Level Servo Loop to perform the recursive addition. An example of the Path Tables which are created in the Path Construction Task is illustrated in FIG. 5. In practice, two Path Tables are constructed, and the microprocessor toggles between them after 100 cycles of the Low Level Servo Loop routine has been implemented for all six axes. In other words, the values stored in Path Table #1 are used for the first 100 cycles of control for each axis, the values in Path Table #2 are used for the second 100 control cycles for each axis, and so forth. In the example described herein, six independent axes of motion are controlled by the microprocessor 12. Accordingly, each Path Table contains six values for each of the four parameters of desired position, velocity, acceleration and jerk. Each stored value comprises two parts, a number of whole encoder counts W, and a number of fractional encoder counts F. Each time the recursive addition step 3 of the Low Level Servo Loop is implemented, the velocity value 36 for the axis under control is added to the position value 34, the acceleration value 38 is added to the velocity value 36, and the jerk value 40 is added to the acceleration value 38. The new desired position value which is computed by adding the velocity value 36 to the previously stored position value 34 is then used throughout the rest of the cycle for controlling the position of the motor during that control cycle.

Although the motor encoders 22 only produce integral numbers of pulses in representing actual motor positions, the fractional values F for desired position velocity, acceleration and jerk are stored in the tables to provide continued accuracy over multiple iterations of the recursive addition process.

After 100 cycles of operation of the low level servo control algorithm for each axis (600 cycles total), the microprocessor toggles to the other Path Table (Step 42, FIG. 4), to access updated information which is used to control the motion along the respective axes for the next 100 cycles. During this time, the values in the previously used Path Table are updated for subsequent use in the next group of 100 control cycles.

Figure 6:
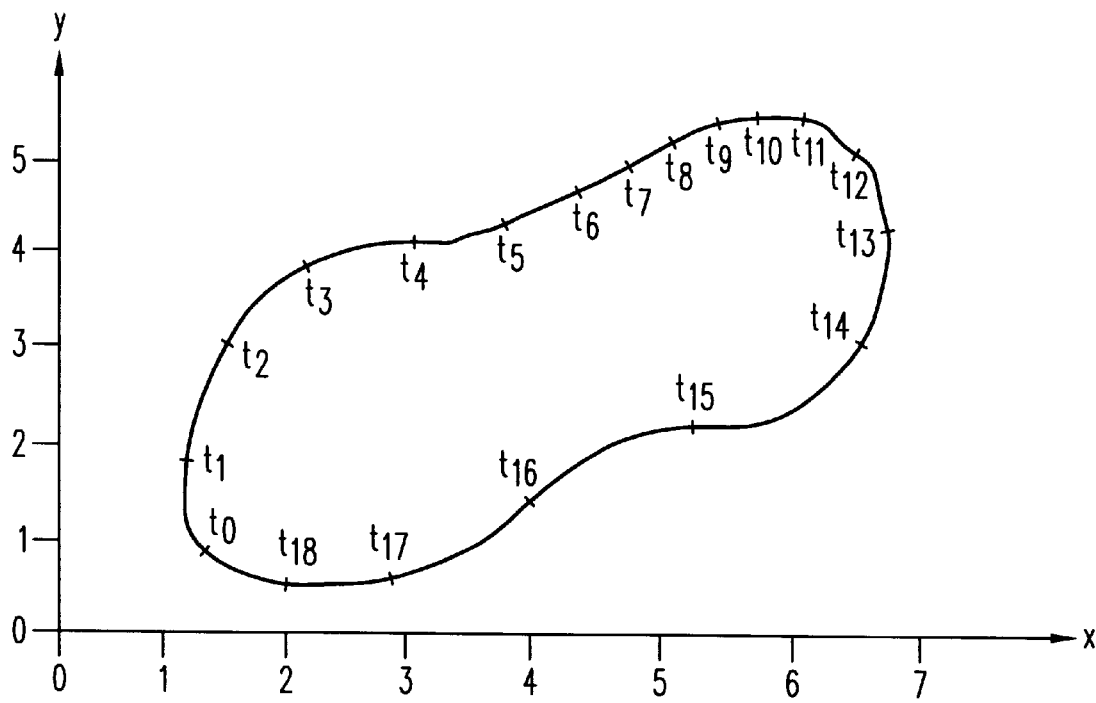
FIG. 6 is an illustration of an exemplary second-order curve along which a machine tool is controlled to move.
Figure 7:
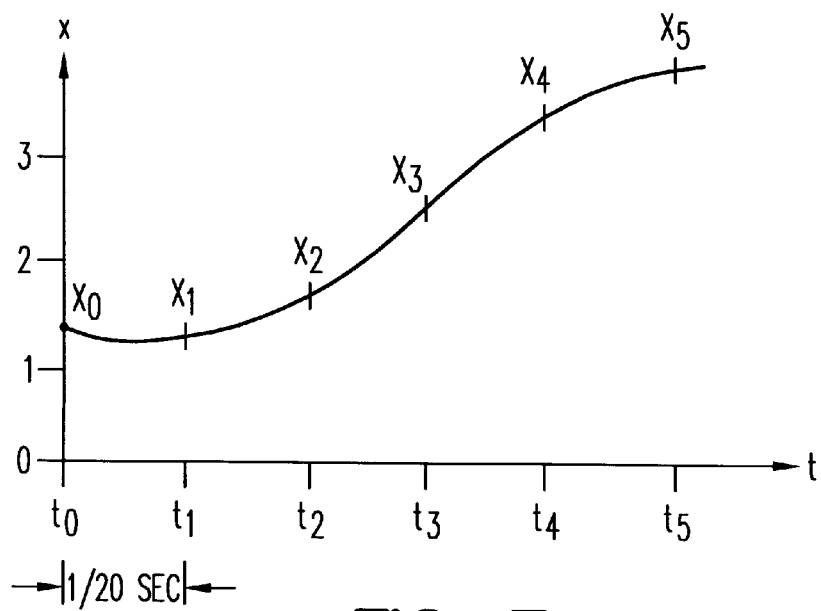
FIG. 7 is an illustration of the parametric representation of the curve of FIG. 6 along one axis.
Figure 8:
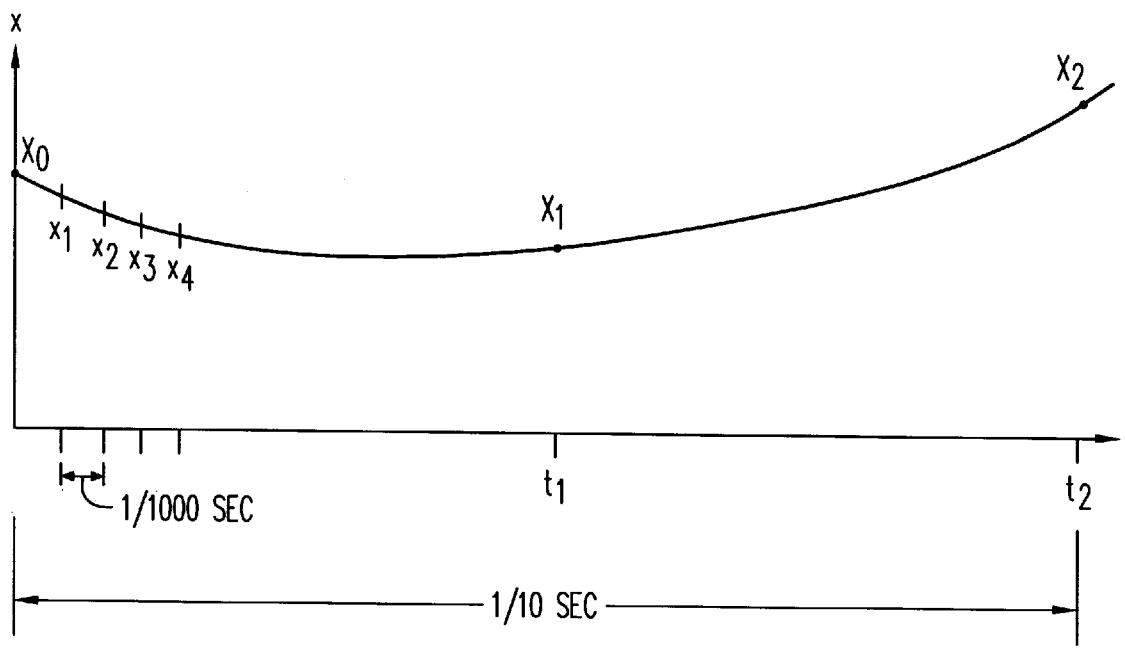
FIG. 8 is a more detailed illustration of the first three data points on the curve of FIG. 7.

The manner in which the Path Construction Task of FIG. 4 operates to derive the particular values that are stored in the Path Table is explained with respect to FIGS. 6–8. To facilitate an understanding of the principles presented herein, the following example of the generation of data pertaining to a second order curve, i.e. a two-dimensional curve, is given. The extrapolation of these principles to third and higher order curves, as well as additional axes, will be readily apparent to those of ordinary skill in the art.

An example of a path that might be followed by a cutting tool during operation is illustrated in FIG. 6. This path is two dimensional in nature, and can be defined by two parametric second order polynomials corresponding to two axes, x and y. Such a curve might be defined and stored in the memory 32 by the user through a CAD program, for example, which is preferably included within the User Interface Task 31.

In the implementation of the present invention, the polynomials which define the curve are converted into recursive values for position, velocity, acceleration and jerk (if appropriate) for each axis, which are stored in the Path Tables of FIG. 5. To perform such a conversion, a series of time points $t_0$–$t_{18}$ are labeled on the curve. The placement of these points is arbitrary and suitably chosen by the user to optimize the machine operation to the available computing power. Essentially, each point represents a fixed period of time. In the present example, each point is representative of ½0th of a second. The total number of points therefore represents the amount of time it takes the machine tool to transcribe the illustrated path. Thus, with 18 time points as shown, the machine tool would transcribe this path in slightly less than one second.

Once the time points have been placed on the curve, their coordinate values $(X_n, Y_n)$ are stored in the memory 32. The microprocessor 12 then transforms them into a parametric representation for each axis of motion. The parametric representation of the curve for the x axis is illustrated in FIG. 7. In the graph illustrated in this figure, the horizontal axis represents time and the vertical axis represents position along the x axis. For each of the time points $t_n$ along the curve of FIG. 6, its x-axis value is plotted in the parametric representation of FIG. 7. Thus, at time to the value $X_0$ is plotted, at time $t_1$ the value $X_1$ is plotted, etc. The resulting curve represents the path of motion that is taken along the x axis to transcribe the curve. A similar such parametric representation is made for the y axis values.

As noted above, the distance between two adjacent time points is representative of 1/20th of a second. Therefore, any three consecutive data points along the parametric representation is indicative of 1/10th of a second, which is the length of time that the Low Level Servo Task operates before calling for an updated Path Table. Thus, for each Path Table, the data represented by the parametric curve along three consecutive points is used to determine the stored values.

An expanded view of a portion of FIG. 7, illustrating the curve between the first three data points $X_0$, $X_1$ and $X_2$, is illustrated in FIG. 8, and represents 1/10th of a second. The curve defined by passing through these three points can be represented as the unique second order polynomial $$x=a+bt+ct^2.$$

Since the values for x are known for each of $t_0$, $t_1$ and $t_2$, the coefficients a, b and c can be readily determined (Step 44, FIG. 4). Using these coefficients, the desired x position value at any given instant in time can be computed. Since the Low Level Servo Task is carried out for each axis at a rate of 1000 times per second, the desired x position is thus calculated for each of the first three thousandths of a second. These calculations are carried out as follows:

$$x_0 = a$$
$$x_1 = a + bt_1 + ct_1^2$$
$$x_2 = a + bt_2 + ct_2^2$$

where $t_0=0$, $t_1=1/1000$ of a second and $t_2=2/1000$ of a second.

From these values the desired values for velocity and acceleration can also be computed as follows (Step 46):

$$v_0 = x_1 - x_0$$
$$v_1 = x_2 - x_1$$
$$a_0 = v_1 - v_0$$

Once each of these values has been computed, the values for $x_0$, $v_0$ and $a_0$ are stored in the Path Table at the appropriate locations corresponding to position, velocity and acceleration, respectively, for the x axis (Step 48). These values are subsequently processed during each recursive addition step in the Low Level Servo routine, as described previously. This technique can be extended to higher order curves in a straightforward manner by computing additional values for x, v, a and j (if appropriate) for subsequent time periods.

Once the Path Construction Task completes the table, the registers are popped (Step 50) and the microprocesser returns to the foreground routine until the next interrupt occurs.

User Interface Task

The User Interface Task (UIT) 31 is the foreground task. Although it does not form a part of the servo control loop, it will be described for completeness of understanding. Essentially, this task is a CAD/CAM system with features which allow the operator to have control over the operation of motor controls that operate in the background. The UIT is the section of software which the CPU executes when no other tasks are pending or executing.

It appears to the user that the UIT is running all the time. The maximum amount of time spent away from this task to perform one of the other routines is about 35 milliseconds. The response delay associated with this interruption is not perceptible to the user. This task monitors the keyboard and manages the text and graphics screens available to the user as part of the CAD/CAM package.

The part of the UIT which handles the geometric computations for the two-dimensional graphics display is called the graphics engine. The graphics engine code is very similar to code in the Path Construction Task called the execution engine, which handles the geometric computation for the three dimensional tool path. These two engines can be similar because most geometries occur in two dimensions, not three. Because this engine code uses many global variables, it would be difficult to make it reentrant (interruptible). It is therefore preferably duplicated in both the Path Construction Task and the UIT so that the execution engine can run concurrently with the graphics engine. This means to the user that the system can be used to program one set of operations while it is executing another.

The UIT is a software loop which updates the screen every cycle and monitors the keyboard and mouse. The worst case loop time is about 1/3 second while the software is interactively drawing long, complex curves or large diameter circles. The UIT's primary function is to create a sequenced list of operations which define the shape of the desired article. The overall program uses this list in two ways:

1. The UIT uses this list (or parts of it) to display on the screen a representation which enables a user to visualize what a part looks like;

2. The Path Construction Task uses the list as described with reference to FIG. 6, to guide it through a sequence of cutting operations which will produce an actual machined part.

One of the major obstacles to direct use of CAD data by CNC systems is that the purpose of CAD is to represent parts design to people either on a computer screen or on paper. The sequence of drawing such a representation is unimportant to the human viewer who only looks at a CAD drawing after all entities in the drawing have been drawn. Therefore CAD systems make no effort to keep track of drawing sequence. It turns out that the data which underlies CAD drawings contains much of the same information necessary to perform cutting operations to actually make the desired part. The primary objective of computer assisted manufacturing (CAM) is to "fill in" cutting operations implied by the CAD data and to put all operations into a usable sequence.

In the CAD/CAM UIT which forms part of the preferred embodiment of the present invention, all drawing and editing that is done during the design phase produces data that describes a sequence of operations and all information necessary to "fill in" cutting details such as pocket routines, tool compensation, and so on. This sequence information is maintained with the CAD data.

Since conventional CAD programs do not keep track of sequence, each entity they keep in the underlying data base must contain redundant information. For example a line must store both end points. When two lines are meant to connect, they are both in random locations in the data base, and if the user wants to move that connecting point, somehow the two end points must be matched and both moved.

In the present invention, by keeping track of sequence, only one point per line must be stored because the end of the previous line segment (or other operation) is the beginning of the next. In this way no data must be matched by the system because no redundant data is required (or allowed). Since the data is sequenced and none is redundant, it is possible for the user to intelligently view this data in text rather than graphical form. This alternate "view" of the data turns out to be very useful and easier to work with in many cases. Such an approach allows the user to switch very rapidly between a graphical and textual view of the underlying CAD data, add or edit data in either view, and have the new data instantly reflected in both views. Preferably, entities are numbered in both views so they may be related back and forth.

The same techniques used to define and reconstruct paths of motion, as described above, could also be applied to computer graphics. For example, curves which represent objects on a screen could be defined and reconstructed with the recursive technique that describes a multi-order function. Fonts for character display could be computed, displayed, and printed much more quickly, making WYSIWYG (what you see is what you get) formats more practical. Likewise colors or shades in objects or areas of the screen could be so represented. These techniques could be applied to the way objects change from screen to screen in computer animation. In such a case, the parametric step size would be the pixel dimension or printer dot spacing rather than the servo update time used in motion control. The mathematics are identical and thus should be apparent to those skilled in the art.

Similarly, the concept of recursive path definition can be used as the basis for interprocessor communication within a motion control system which uses one processor per axis. With this approach, multiple processing units can be synchronized to follow complex, coordinated paths.

The recursive addition techniques for defining a geometric shape allow faster drawing of complex shapes and do so with a minimum of stored data, and therefore can be considered a data compression and expansion technique. It is also possible to represent changing pitch in sounds (speech, music, etc.) with these recursive techniques. The purpose could be data compression for storage or transmission (e.g., for HDTV broadcast and display). Also the data reduction made possible by these techniques can make speech or image recognition algorithms faster or simpler by "filtering" large amounts of data down to computationally manageable levels.

Thus, it will be appreciated that the present invention is not limited to the specific embodiment described herein to facilitate an understanding of the principles of the invention. Rather, the invention has applicability in a wide range of fields and is limited only by the scope of the claims appended hereto.

What is claimed is:

1. A system for controlling the formation of geometric shapes in materials by moving a tool relative to a workpiece along multiple axes of movement, comprising:

means defining data representative of geometric shapes to be cut or otherwise formed in materials;

means for converting said data into a description of a path to be followed by the tool and storing said description;

a plurality of motors respectively associated with said multiple axes, each of said motors providing relative movement between the tool and the workpiece along an associated one of said axes;

a plurality of feedback devices respectively associated with said plurality of motors for providing feedback information indicative of at least one of the actual position and velocity of the tool along an associated axis; and a single active processor for controlling said data defining means and said data converting means, for receiving feedback information from each of said feedback devices, and for controlling the operation of each of said motors to provide coordinated relative movement between the tool and the workpiece along each of said multiple axes in accordance with said stored path description.

2. The servo system of claim 1 wherein said single active processor comprises a single microprocessor.

3. The servo system of claim 1 wherein said active processor produces said coordinated relative movement of the tool by controlling said motors in a cyclic manner, wherein each cycle comprises a sequential reading of feedback information and generation of a motor control signal for each of the axes being controlled.

4. The system of claim 3 wherein said data comprises a sequence of operations which define said geometric shape, and said data converting means processes said sequence of operations to produce a table that describes the movement of the tool along each axis, relative to the workpiece, for each cycle of operation.

5. The system of claim 1 wherein said data defining means includes a user interface by means of which a user communicates with said single active processor to define and/or modify geometric shapes, and wherein said single active processor stores said data in response to communications received from a user through said user interface.

6. A method for providing coordinated movement of a device along multiple axes of motion by means of a single active processor, comprising the steps of:

a) determining desired movement of the device along each of said axes of motion for successive increments of time;

b) carrying out one cycle of control in said active processor for one of said increments of time, said cycle including the steps of:

i) determining, on the basis of said desired movement, at least one of a desired position and desired velocity of the device along one of said axes;

ii) detecting at least one of the actual position and actual velocity of the device along said one axis;

iii) calculating at least one of a position error and a velocity error along said one axis for said increment of time;

iv) generating a pulse-width modulated control signal to produce movement along said one axis that is effective to reduce said error by:

determining a center value indicative of the average width of the pulse-width modulated signal over plural previous cycles of operation;

computing a response based on said error and detecting whether said response is less than or greater than a reference value;

increasing said center value when said response is greater than said reference value and decreasing said center value when said response is less than said reference value; and summing said center value and said response to determine the width of said pulse-width modulated signal; and v) sequentially repeating steps i, ii and iii for each of the other axes; and c) repeating step b for each of the successive increments of time.

7. The method of claim 6 wherein said step of determining desired movement includes the steps of:

parametrically representing the path of movement of the device along one axis for successive periods of time;

determining the coefficients of a polynomial which describes at least a portion of said parametric representation;

computing recursive values for at least position and velocity at the beginning of a period of time from said coefficients; and storing said recursive values in a table.

8. The method of claim 7 further including the steps of computing a recursive value for acceleration from said coefficients, and storing said value in said table.

9. The method of claim 8 further including the steps of computing a recursive value for change of acceleration from said coefficients, and storing said value in said table.

10. The method of claim 8 further including the step of computing desired position for successive increments of time by cyclically summing said stored velocity value with said stored position value, to compute a new position value, summing said stored acceleration value with said stored velocity value to compute a new velocity value, and updating said table with said new values.

\* \* \* \* \*

(12) EX PARTE REEXAMINATION CERTIFICATE (6627th)
United States Patent
Trounson

(10) Number: US 5,926,389 C1
(45) Certificate Issued: Jan. 20, 2009

(54) COMPUTER CONTROL SYSTEM FOR GENERATING GEOMETRIC DESIGNS

(75) Inventor: James E. Trounson, Laurel, MD (US)

(73) Assignee: Trounson Automation LLC, Suffern, NY (US)

Reexamination Request:
No. 90/008,168, Dec. 18, 2006

Reexamination Certificate for:
Patent No.: 5,926,389
Issued: Jul. 20, 1999
Appl. No.: 08/193,634
Filed: Feb. 8, 1994

Related U.S. Application Data

(63) Continuation of application No. 07/655,857, filed on Feb. 15, 1991, now abandoned.

(51) Int. Cl.
*G05B 19/414* (2006.01)
*G05B 19/4099* (2006.01)
*G05B 19/19* (2006.01)
*G05B 19/4097* (2006.01)
*G05B 19/25* (2006.01)

(52) U.S. Cl. .................. 700/187; 700/188; 700/61
(58) Field of Classification Search ............ 700/61, 700/187–188
See application file for complete search history.

(56) References Cited

U.S. PATENT DOCUMENTS

| 4,027,245 A | 5/1977 | Bourrat et al. |
| 4,130,788 A | 12/1978 | Fiegehen et al. |

FOREIGN PATENT DOCUMENTS

| JP | 64-19409 | 1/1989 |
| JP | H01-246605 | 10/1989 |

OTHER PUBLICATIONS

Olson et al. "Smart Motor Controller—A New Breed," Official Proceedings of the 11th International Motor–Con '87 Conference, Sep. 14–17, 1987.
Olson et al. "VME–Sized Card Controls DC and AC Motors," (Intelligent Motion) PCIM Magazine, Jan. 1988.
Delta Tau Data Systems "Smart Motion Control Card (SMCC) P/N 602090–100 Instructions/Operations Manual," Oct. 1988 and "IBM P.C. Based Programming Software" Feb. 1989.
Galil Motion Control, Galil DMC–230 Advanced Motor Controller, Stand Alone Controller Brochures, DMC/600 Advanced Motion Controller and DMC–230 Motion Controller Capabilities and Design Examples, Aug. 1987.
Wilson "Considerations for Motion Controller Trajectory Generators", Intelligent Motion, Oct. 1990 Proceedings.
Yoram Koren, "Computer Control of Manufacturing Systems," McGraw–Hill Book Company, 1983.
Dimitri Dimitri and William Olson, "Motion Control Technique Uses DSP To Control Eigth Axes of Motion," Intelligent Motion, Oct. 1989 Proceedings.
Curtis S. Wilson, "DSP Chips in Coordinated Multi–Axis Servo Control," Proceedings of The First Annual Motion Control Conference, Apr. 11–13, 1989.

*Primary Examiner*—Alexander J Kosowski

(57) ABSTRACT

A servo control system for a machine tool or the like requires only a single computational resource, such as a microprocessor, to provide coordinated control along multiple axes. No active control mechanism is required for any axis outside of the single resource. A real time multitasking approach enables the single resource to control multiple axes of motion, with the control of each individual axis being carried out by means of simple, yet effective, routines that conserve computing power. The routines also facilitate the generation of geometric designs in other media, such as the display of such shapes on a video screen or via a printer.

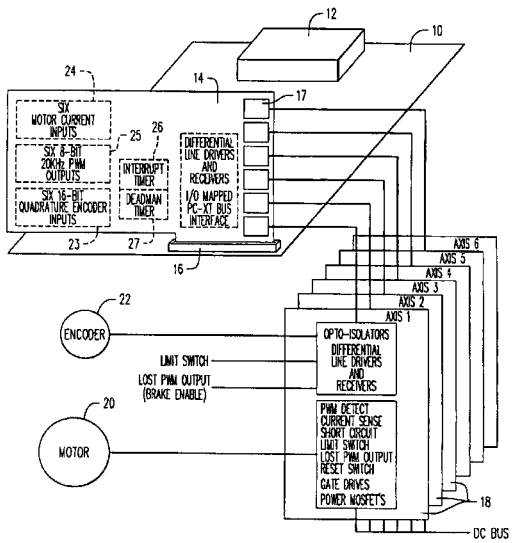

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 6 is confirmed.

Claims 2–5 and 7–10 were not reexamined.

* * * * *